United States Patent Office 3,072,662
Patented Jan. 8, 1963

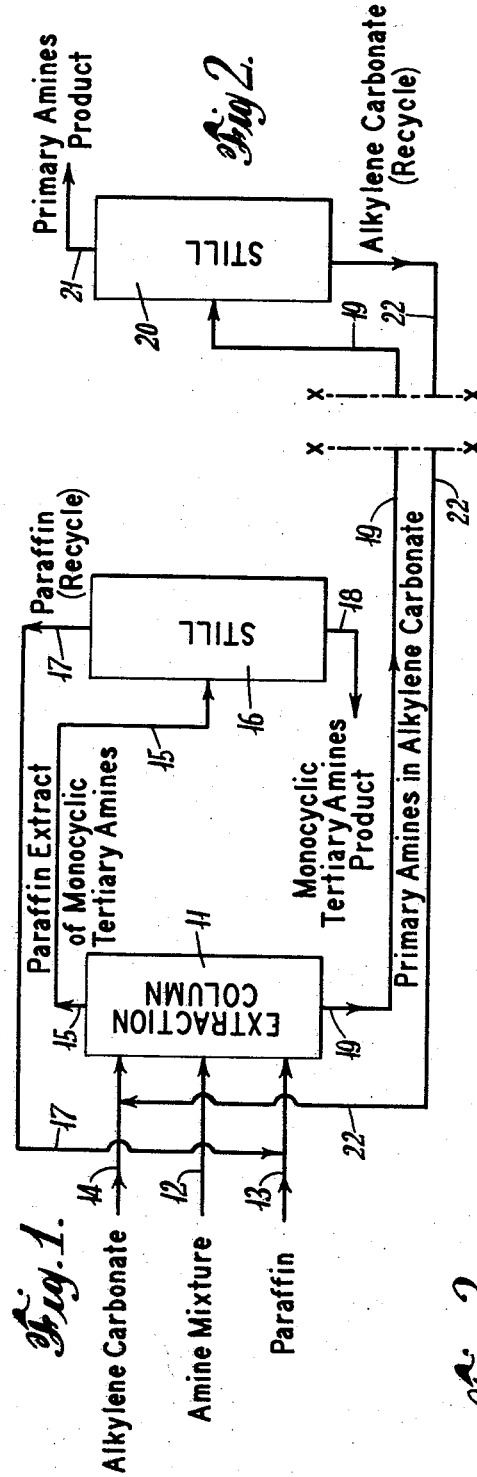

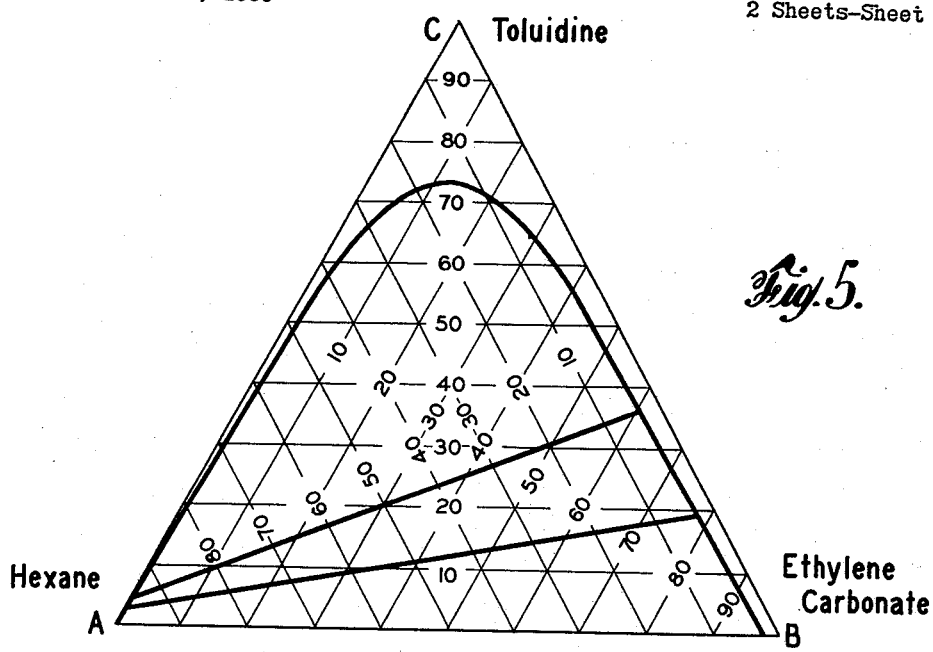
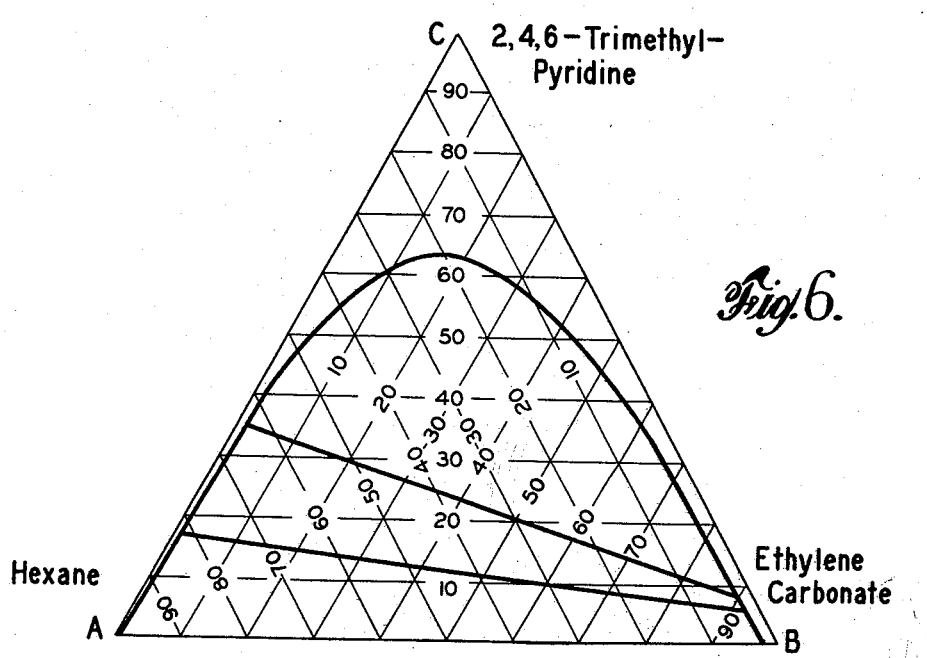

3,072,662
SEPARATION OF AROMATIC AMINES USING ALKYLENE CARBONATES
James V. Murray, Jr., South Charleston, and Donald J. Foster, Charleston, W. Va., assignors to Union Carbide Corporation, a corporation of New York
Filed Mar. 4, 1959, Ser. No. 797,303
8 Claims. (Cl. 260—290)

This invention is directed to chemical processes. More particularly, it is directed to processes for the separation of aromatic amines from mixtures thereof.

This application is a continuation-in-part of our copending application Serial No. 609,987 filed September 14, 1956, now abandoned.

Mixtures of aromatic amines occur in certain commercial products, as for example, in certain oil fractions derived from the hydrogenation of coal. In the processing of coal hydrogenation products a mixture of aromatic amines is obtained, usually comprised predominantly of primary and tertiary aromatic amines. The tertiary amines are often a mixture of monocyclic tertiary aromatic amines, i.e. of the pyridine type or N,N-dialkyl aniline type and polycyclic tertiary amines, i. e. of the quinoline or isoquinoline type. For the further utilization of such amines it is essential that the amines in the mixture be separated according to type. Of importance in the resolution of an aromatic amine mixture is the separation of primary amines from monocyclic tertiary amines. This is particularly true of amine mixtures derived from coal hydrogenation, as such mixtures usually are composed predominantly of primary aromatic amines and monocyclic tertiary amines. Some polycyclic tertiary aromatic amines may also be present, but suitable methods for separating primary aromatic amines from polycyclic tertiary aromatic amines are known.

Heretofore the ready separation of primary aromatic amines from monocyclic tertiary amines has not been possible, as far as is known, except in laboratory scale processes which are not economically and efficiently adaptable to commercial production. Some such laboratory processes depend upon the formation of an amide of an organic acid with primary amines, while the tertiary amines remain unchanged. The amides are usually neutral or so very weakly basic that extraction of the tertiary amines from the amides can be accomplished by acid extraction. Methods of this type are not practical, save for laboratory separations, because of the many neutralizations, dilutions, regenerations and concentrations involved. Other laboratory separations attempt to take advantage of differences in the base strengths of the amines in the mixtures. This type of separation is feasible only if the number of different amines is low and their base strengths are widely divergent. When, as in aromatic amine mixtures from coal hydrogenation, there are a considerable number of different aromatic amines present, of both primary and tertiary types, and there is overlapping of basic strengths, a separation attempting to employ this principle is not feasible for commercial operation.

In the present invention we provide an economical, commercially usable process for the separation of amine mixtures, employing readily available compounds and ordinary process equipment. Our process is a liquid phase extraction process using an alkylene carbonate and a liquid paraffin hydrocarbon, substantially immiscible with the carbonate, as the extracting solvents. The invention is based on our discovery that certain alkylene carbonates will dissolve all types of aromatic amines and that when a paraffin hydrocarbon, itself immiscible with the carbonate, is contacted with such a solution the paraffin will selectively dissolve and remove from the carbonate substantially all of the monocyclic tertiary aromatic amines present. All of the primary aromatic amines, secondary aromatic amines and polycyclic tertiary amines present will remain in solution in the carbonate. As the paraffin hydrocarbon is chosen to be substantially immiscible with the alkylene carbonate selected, the two solutions separate into layers readily and the amines can then be recovered from their respective solutions.

Monocyclic tertiary amines which can be selectively removed by the process of the invention include pyridine, 2-methylpyridine, 1-methylpyridine, 4-methylpyridine, 2-ethylpyridine, 3-ethylpyridine, 4-ethylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2-propylpyridine, 3-propylpyridine, 4-propylpyridine, 2-methyl-5 ethylpyridine, 3-methyl-5 ethylpyridine, 4-methyl-3 ethylpyridine, 2,3,4-trimethylpyridine, 2,3,5-trimethylpyridine, 2,6-dipropylpyridine and the like.

Primary aromatic amines from which monocyclic tertiary aromatic amines can be separated by the process of the invention include aniline, ortho-toluidine, meta-toluidine, para-toluidine, 2-ethylaniline, 3-ethylaniline, 4-ethylaniline, 2,3-xylidine, 2,4-xylidine, 2,5-xylidine, 2,6-xylidine, 3,4-xylidine, 3,5-xylidine, 2-propylaniline, 3-propylaniline, 4-propylaniline, 3-methyl-5-ethylaniline, 4-methyl-2 ethylaniline, 3-methyl 4-ethylaniline, 1-naphthylamine, 2-naphthylamine and the like.

Secondary aromatic amines from which monocyclic tertiary aromatic amines can be separated by the process of the invention include N-methylaniline, N-methyl-ortho-toluidine, N-methyl-meta-toluidine, N-methyl-para-toluidine, N-methyl-ortho-ethylaniline, N-methyl-meta-ethylaniline, N-methyl-para-ethylaniline, N-ethyl-ortho-toluidine, N-ethyl-meta-toluidine, N-ethyl-para-toluidine, N-methylnaphthylamine.

Polycyclic tertiary amines from which the monocyclic tertiary aromatic amines can be separated by the process of the invention include quinoline, 2-methylquinoline, 7-methylquinoline, isoquinoline, 3-methylisoquinoline, N,N-dimethylnaphthylamine and the like.

While we do not wish to be bound by any theory as to the chemical mechanism involved in the process, we believe that the relative solubilities of aromatic amines in our solvents are as above described due to the relative availability of N-hydrogens in the various types of amines. Primary and secondary aromatic amines have hydrogen atoms substituted on the nitrogen. These hydrogen atoms are acidic and are available for bonding with a Lewis type base. The tertiary amines have no such hydrogens available for such bonding. Ethylene carbonate and propylene carbonate are Lewis bases and bond in this manner with primary aromatic amines and secondary aromatic amines, but not with tertiary aromatic amines. These carbonates will, however, dissolve all types of aromatic amines, including tertiary aromatic amines, even though the bonding does not occur with the latter. Thus when an ethylene carbonate or propylene carbonate solution of aromatic amines of all types is contacted with a paraffin hydrocarbon, the bonded primary and secondary amines will remain in the carbonate solution, as will the polycyclic tertiary amines, but the unbonded monocyclic tertiary amines will preferentially dissolve in the paraffin hydrocarbon. The apparently anomalous behaviour of the polycyclic tertiary aromatic amines remaining in solution in the alkylene carbonate, despite the lack of a hydrogen for bonding, is not fully understood.

According to the process of our invention an aromatic amine mixture is brought into absorptive contact with both a paraffin hydrocarbon and either ethylene carbonate or propylene carbonate. The primary amines, secondary amines and polycyclic tertiary amines dissolve in the alkylene carbonate and the monocyclic tertiary amines dissolve in the paraffin hydrocarbon. The monocyclic tertiary amines-paraffin solution is distilled to recover the amines by removal of the paraffin, which can be recycled to the process. The alkylene carbonate can be separated from the carbonate solution of primary amines and/or secondary amines and/or polycyclic tertiary amines in several ways. If the amines are low boiling, that is, boil below the boiling temperature of the carbonate, distillation may be employed to remove the amines from the carbonate. Distillation at reduced pressure is preferred to prevent reaction of the carbonate with the amines. In another embodiment of this stage of the process an ether is employed to extract the primary amines from the carbonate and the ether is then distilled from the amines and recycled to the process. In yet another embodiment the amines-carbonate solution is contacted with water and an amines layer or phase and a water-carbonate layer or phase results, which are easily separated. The water can then be vaporized from the carbonate. In all embodiments the carbonate is recovered for recycle.

FIG. 1 is a flow sheet of one embodiment of the extraction process of the invention. For clarity only the primary aromatic amines are designated in the drawing but it is to be understood that secondary aromatic amines or polycyclic tertiary aromatic amines, or any mixture of the three will be extracted in the same manner as the primary aromatic amines and follow the same course in the flow sheet.

FIG. 2 is a flow sheet which is a continuation of FIG. 1 from the indicated point, and which illustrates recovery of the amines from the carbonate solution by vaporization.

FIG. 3 is a flow sheet which is a continuation of FIG. 1 from the indicated point, and which illustrates recovery of the amines from the carbonate solution by water-washing.

FIG. 4 is a flow sheet which is a continuation of FIG. 1 from the indicated point and which illustrates recovery of the amines from the carbonate solution by extraction with ether.

FIG. 5 is a ternary diagram illustrating the relative solubility of toluidine, a primary amine, in a mixture of ethylene carbonate and the paraffin hydrocarbon hexane.

FIG. 6 is a ternary diagram illustrating the relative solubility of 2,4,6-trimethyl pyridine, a monocyclic tertiary amine, in a mixture of ethylene carbonate and the paraffin hydrocarbon hexane.

In FIG. 1 there is represented an operation employing an extraction column 11 for the extraction of the aromatic amine mixture by an alkylene carbonate and by a paraffin hydrocarbon, and a still 16 for the recovery of the monocyclic tertiary amines product from the paraffin hydrocarbon extract thereof. The amine mixture, containing primary, secondary and tertiary amines, is introduced into extraction column 11 through feed line 12. A paraffin hydrocarbon is introduced into the column 11 through feed line 13 and an alkylene carbonate is introduced into the column 11 through feed line 14. Extraction occurs and a paraffin hydrocarbon extract of monocyclic tertiary amines is removed from the extraction column 11 through line 15 and conducted to still 16. In still 16 the paraffin hydrocarbon is vaporized from the monocyclic tertiary amines and removed from the still 16 through line 17, wherein it condenses and is recycled to the paraffin feed line 13, for reuse in the process. The monocyclic tertiary aromatic amines are removed from the still 16 as product through line 18. The solution of primary aromatic amines in an alkylene carbonate is removed from the extraction column through line 19.

In the embodiment of a process for recovering primary, secondary and polycyclic tertiary amines from alkylene carbonate solution represented in FIG. 2, a still 20 is employed. The alkylene carbonate-primary amines solution from the extraction column 11 in FIG. 1 is conducted through line 19 into still 20. In still 20 the primary amines (as well as any secondary or polycyclic tertiary amines) are vaporized as product from the alkylene carbonate-amines solution and this amines product is removed from the still 20 through line 21. The alkylene carbonate from which the amines have been distilled is removed from the still 20 through line 22 and is recycled through line 22 to the alkylene carbonate feed line 14, in FIG. 1, for reuse in the process.

In a different embodiment of the recovery of amines from the carbonate-amines solution, as represented in FIG. 3, first a settling tower 31 and then a still 35 are employed. The alkylene carbonate-amines solution from the extraction column 11 in FIG. 1 is through line 19 into a settling tower 31. Water is introduced into the settling tower 31 through line 32. As the water dissolves the alkylene carbonate, the resulting aqueous alkylene carbonate solution forms a layer separate from the primary aromatic amines and the primary aromatic amines are removed as product from the settling tower 31 through line 33. The aqueous solution of alkylene carbonate is removed from the settling tower 31 through line 34 and is conducted through line 34 to a still 35. In the still 35 the water is vaporized from the aqueous solution of alkylene carbonate and is removed from the still 35 through line 36. The alkylene carbonate from which the water has been removed is conducted from the still 35 through line 22 and is recycled through line 22 to the alkylene carbonate feed line 14, in FIG. 1, for reuse in the process.

In yet another embodiment of the recovery of primary, secondary and polycyclic tertiary aromatic amines from the carbonate-amines solution, as represented in FIG. 4, first an extraction column 41 and then a still 44 are employed. The alkylene carbonate-amines solution from the extraction column 11 is conveyed through line 19 into an extraction column 41. An ether is introduced into the extraction column 41 through ether feed line 42. As the extraction of the amines by the ether proceeds, an ether extract of amines is removed from the extraction column 41 through line 43, and is conducted through line 43 into a still 44. The alkylene carbonate, from which the ether has extracted the amines, is removed from the extraction column 41 through line 22 and is recycled through line 22 to the alkylene carbonate feed line 14 in FIG. 1, for reuse in the process. In the still 44 the ether is vaporized from the ether extract of amines and the amines product thus obtained is removed from the still 44 through line 45. The ether thus separated from the amines is conducted from the still 44 through line 46 and is recycled through line 46 to ether feed line 42, for reuse in the process.

The extraction process of the invention is operated in the liquid phase. The operating temperatures are not critical but must be high enough that all the components of the system are liquid. However, the decomposition temperatures of the components must not be exceeded. It is usually satisfactory to operate the carbonate extractions at a temperature just above the melting point of ethylene carbonate or at room temperature with propylene carbonate. Temperatures below 50° C. are preferred because they permit operation at atmospheric pressure. Higher temperatures could be employed but would probably require superatmospheric pressure to keep the paraffin hydrocarbon in the liquid state. The preferred carbonate, ethylene carbonate, has a melting point of about 36° C. and a boiling point of about 243° C. Propylene carbonate, the other carbonate which can be employed in the process of the invention, has a freezing point of about −49° C. and a boiling point of about 242° C.

The paraffin hydrocarbon employed in the process of the invention can be a paraffin hydrocarbon of suitable boiling temperature ranges. The paraffin hydrocarbon should be a liquid at the desired operating temperature of the process and should have a normal boiling temperature below the lowest normal boiling temperature of any monocyclic tertiary amine present, inasmuch as the paraffin is distilled from these amines in the process. As used herein the term paraffin hydrocarbon includes linear paraffin hydrocarbons, branch chain paraffin hydrocarbons and cycloparaffin hydrocarbons. Suitable paraffins include hexane, pentane, heptane, octane, iso-octane, methylcyclophentane, cyclohexane, nonane, decane, kerosenes, and the like, as well as mixtures of any of the above.

The ether employed in recovering the carbonate according to one embodiment of the invention is a lower aliphatic ether containing from 4 to 12 carbon atoms. Such ethers include ethyl ether, isopropyl ether, n-propyl ether, butyl ethers, pentyl ethers, hexyl ethers and mixed ethers of any of the above groups, which mixed ethers do not contain more than 12 carbon atoms.

The process of the invention may be operated either as a batch operation or as a continuous operation, through for reasons of economy and efficiency continuous operation will usually be found preferable. In the process the preferred ratio of primary aromatic amines to alkylene carbonate is about one to four by weight, though the process is operable using from 1 to 20 parts by weight of carbonate to one part of primary amines. The weight ratio of paraffin hydrocarbon to alkylene carbonate employed should be between one and three parts by weight of paraffin to one part of carbonate.

In the extraction of the carbonate from the primary amines by water, room temperature and atmospheric pressure are suitable. From 2 to 10 parts by weight of water per part of carbonate solution are employed. In the embodiment of the carbonate-amines separation employing ether, room temperature and atmospheric pressure are also suitable. Ether is employed in the amount of from 0.25 to 5 parts by weight of ether per part of carbonate solution.

The invention is directed to the separation of aromatic amines and is not suitable for use with most aliphatic amines, due to reaction of the aliphatic amines with the carbonate. However, tertiary aliphatic amines have little tendency to such reaction and if subjected to the process of the invention behave like monocyclic tertiary amines and are found in the paraffin hydrocarbon solution.

The following examples are illustrative.

*Example I*

An amine mixture obtained from coal hydrogenation light oil product was extracted by the process of the invention, and the carbonate-amine solution thus obtained was separated by the addition of water, followed by layering and decanting, according to one embodiment of the invention. The amine mixture had a boiling temperature range between 175° C. and 230° C. and consisted of 71.6 percent by weight of primary amines and 28.2 percent by weight of monocyclic tertiary amines. A temperature of 45° C. was maintained in the apparatus which consisted of an 11 stage York-Scheibel extraction column of one-inch inside diameter and 48 inches in length and was operated at atmospheric pressure. Concurrently, 1.0 part by weight of the amine mixture was fed into the middle of the column, 2.1 parts by weight of ethylene carbonate were fed into the top of the column, and 2.8 parts by weight of n-hexane were fed into the base of the column. An amine mixture consisting of more than 95 percent by weight of monocyclic tertiary amines was extracted by the hexane and this hexane extract was removed from the top of the column, after which the hexane was separated from the amines by distillation. The ethylene carbonate extracted an amine mixture consisting of more than 90 percent by weight of primary amines, and this ethylene carbonate extract was removed from the bottom of the column. The amines were then separated from the ethylene carbonate by the addition of water followed by decantation, the ethylene carbonate going into the water layer.

*Example II*

An amine mixture obtained from coal hydrogenation light oil product was extracted by the process of the invention, and the carbonate-amines solution thus obtained was separated by vaporization of the amines according to one embodiment of the invention. The amine mixture had a boiling temperature range between 175° C. and 190° C. and consisted of 68 percent by weight of primary amines and 32 percent by weight of monocyclic tertiary amines. A temperature of 45° C. was maintained in the apparatus which consisted of an 11 stage York-Scheibel extraction column of one-inch inside diameter and 48 inches in length and was operated at atmospheric pressure. Concurrently, 1.0 part by weight of the amine mixture was fed into the middle of the column, 2.0 parts by weight of ethylene carbonate were fed into the top of the column and 3.0 parts by weight of n-hexane were fed into the base of the column. An amine mixture consisting of more than 97 percent by weight of monocyclic tertiary amines was extracted by the hexane and this hexane extract was removed from the top of the column, after which the hexane was separated from the amines by distillation. The ethylene carbonate extracted an amine mixture of more than 91 percent by weight of primary amines, and this ethylene carbonate extract was removed from the bottom of the column. The amines were then separated from the ethylene carbonate by distillation at reduced pressure.

*Example III*

An amine mixture obtained from coal hydrogenation light oil product was extracted by the process of the invention, and the carbonate-amines solution thus obtained was separated by the addition of water, followed by layering and decanting, according to one embodiment of the invention. The amine mixture had a boiling temperature range between 232° C. and 244° C. and consisted of 39 percent by weight of primary amines and 61 percent by weight of tertiary amines. Of the tertiary amines, 43.6 percent by weight were homologs of pyridine and 56.4 percent by weight were homologs of quinoline and isoquinoline. Thus the amine mixture comprised, on a weight basis, 39.0 percent primary amines, 34.4 percent polycyclic tertiary amines of the quinoline type and 26.6 percent monocyclic tertiary amines of pyridine type. A temperature of 45° C. was maintained in the apparatus which consisted of an 11 stage York-Scheibel extraction column of one inch inside diameter and 48 inches in length and was operated at atmospheric pressure. Concurrently, 1.0 part by weight of the amine mixture was fed into the middle of the column, 2.1 parts by weight of ethylene carbonate were fed into the top of the column and 2.0 parts by weight of n-hexane were fed into the base of the column. An amine mixture consisting of more than 93 percent by weight of tertiary amines of the pyridine type was extracted by the hexane and this hexane extract was removed from the top of the column, after which the hexane was separated from the amines by distillation. The ethylene carbonate extracted an amine mixture containing 90.5 percent by weight of the tertiary amines of the quinoline type in the original amine mixture fed to the column and 92 percent of the primary amines in the original amine mixture, and this ethylene carbonate extract was removed from the bottom of the column. The amines were then separated from the ethylene carbonate by the addition of water, followed by decantation, the ethylene carbonate going into the water layer. The polycyclic tertiary amines of the quinoline type can then be separated from the primary amines by acetylation of the primary amines followed by aqueous acid treatment to extract the tertiary amines as water soluble salts.

*Example IV*

An amine mixture obtained from coal hydrogenation light oil product was extracted by the process of the invention, and the carbonate-amines solution thus obtained was separated by the addition of water, followed by layering and decanting, according to one embodiment of the invention. The amines mixture had a boiling temperature range between 100° C. and 275° C. and consisted of 49.5 percent by weight of primary amines and 50.5 percent by weight of monocyclic tertiary amines. Using a laboratory separatory funnel, 100 grams of this amine mixture was mixed with 100 grams of ethylene carbonate and the resulting mixture was extracted three times successively with n-hexane, 135 grams of hexane being employed for each extraction. The extractions were carried out at room temperature and at atmospheric pressure. The first extract contained 23.15 grams of primary amines and 11.35 grams of monocyclic tertiary amines. The second extract contained 12.9 grams of primary amines and 3.1 grams of monocyclic tertiary amines. Third extract contained 3.95 grams of primary amines and 3.05 grams of monocyclic tertiary amines. The hexane was separated from the amines by distillation. The ethylene carbonate raffinate remaining after the extractions contained 42 grams of amines, of which 33.14 grams were primary amines and 8.86 grams were tertiary amines. The amines were separated from the ethylene carbonate by the addition of water followed by decantation, the ethylene carbonate going into the water layer.

*Example V*

One part by weight of N-methyl aniline, a secondary amine, was dissolved in two parts by weight of n-hexane. The resuling solution was extracted with two parts by weight of ethylene carbonate in a single contact extraction at room temperature and atmospheric pressure, using a laboratory separatory funnel. The resulting layers were separated and the hexane layer was found to contain about 8 percent by weight of the N-methyl aniline originally dissolved in the hexane, the hexane being separated from the amine by distillation. The ethylene carbonate layer was extracted with isopropyl ether, the amine being extracted by the ether. After removal of the ether by distillation there remained about 92 percent by weight N-methyl aniline originally dissolved in the hexane.

*Example VI*

A mixture of 25 grams of 2-methyl-5-ethyl pyridine, a monocyclic tertiary amine, and 25 grams of N-methyl aniline, a secondary amine, was dissolved in 100 grams of ethylene carbonate. This solution was then extracted with 100 grams of n-hexane in a single contact extraction at room temperature and at atmospheric pressure, using a laboratory separatory funnel. The resulting layers were separated and the hexane layer, after removal of the hexane by distillation, was found to contain 23.5 grams of amines, which analysis showed to consist of 16.5 grams of 2-methyl-5-ethyl pyridine and 7.0 grams of N-methyl aniline. The ethylene carbonate layer was extracted with isopropyl ether, the amines being extracted by the ether. After removal of the ether by distillation there remained 25.5 grams of amines, which analysis showed to consist of 7.8 grams of 2-methyl-5-ethyl pyridine and 17.7 grams of N-methyl aniline.

*Example VII*

An amine mixture obtained from coal hydrogenation light oil product was extracted by the process of the invention. This amine mixture had a boiling temperature range between 100° C. and 275° C. A mixture of 100 grams of the amine mixture and 100 grams of ethylene carbonate was extracted with 300 grams of n-hexane in a single contact extraction at room temperature and at atmospheric pressure, using a laboratory separatory funnel. The resulting layers were separated and the hexane layer, after removal of the hexane by distillation, was found to contain 50 grams of amines, which analysis showed to consist of 12.57 grams of primary amines and 37.43 grams of monocyclic tertiary amines. Another 100 grams of the same amine mixture from coal hydrogenation light oil product was mixed with 100 grams of propylene carbonate and the resulting mixture was extracted with 300 grams of n-hexane in a single contact extraction at room temperature and at atmospheric pressure, using a laboratory separatory funnel. The resulting layers were separated and the hexane layer, after removal of the hexane by distillation, was found to contain 66 grams of amines, which analysis showed to consist of 22.75 grams of primary amines and 43.25 grams of monocyclic tertiary amines.

*Example VIII*

A mixture of 20 grams of 2,6-dipropylpyridine, a monocylic tertiary amine, and 20 grams of N,N-dimethylnaphthylamine, a polycyclic tertiary amine, was dissolved in 60 grams of ethylene carbonate at a temperature of about 30° C. To this mixture was then added 60 grams of n-hexane and the resulting mixture was shaken in a separatory funnel, after which the resulting mutually immiscible layers, one a hexane layer and the other a carbonate layer, were separated. The amines were extracted separately from both layers with 6 N,hydrochloric acid. The resulting hydrochloric acid solutions of amines were separately neutralized with a 33 percent solution of sodium hydroxide and the amines that were liberated were dried over potassium hydroxide pellets. The amine contents were determined by infrared and ultraviolet absorption methods. The carbonate layer contained 14.3 grams of N,N-dimethylnaphthylamine but only 1.7 grams of 2,6-dipropyl pyridine. The hexane layer contained 17.5 grams of 2,6-dipropylpyridine but only 4.9 grams of N,N-dimethylnaphthylamine.

What is claimed is:

1. A liquid phase process for the separation of monocyclic tertiary amines from a mixture thereof with primary aromatic amines, secondary aromatic amines, and polycyclic tertiary aromatic amines, which comprises contacting said mixture with a 1,2-alkylene carbonate of from 3 to 4 carbon atoms and with at least one paraffin hydrocarbon that is substantially immiscible with said carbonate and having a boiling temperature lower than that of the lowest boiling monocyclic tertiary amine of said monocyclic tertiary amines, whereby primary aromatic amines, secondary aromatic amines, and polycyclic tertiary aromatic amines are dissolved in said alkylene carbonate, and said monocyclic tertiary amines are dissolved in said paraffin hydrocarbon, separating alkylene carbonate-aromatic amine solution from the paraffin hydrocarbon-monocyclic tertiary amines solution, and recovering the amines from each of their respective solutions; said monocyclic tertiary amines being selected from the group consisting of pyridines and alkyl-substituted pyridines wherein the alkyl group has from 1 to 3 carbon atoms, said primary aromatic amines being selected from the group consisting of aniline, alkyl-substituted anilines wherein the alkyl group has from 1 to 3 carbon atoms, and naphthylamines, said secondary aromatic amines being selected from the group consisting of N-alkyl anilines, N-alkyl-substituted anilines, and N-alkylnaphthylamines wherein said alkyl groups have from 1 to 2 carbon atoms, said polycyclic tertiary aromatic amines being selected from the group consisting of quinoline, 2-methylquinoline, 7-methylquinoline, isoquinoline, 3-methylisoquinoline, and N,N-dimethylnaphthylamine.

2. The method as claimed in claim 1 wherein the alkylene carbonate used is ethylene carbonate.

3. The method as claimed in claim 1 wherein the alkylene carbonate used is propylene carbonate.

4. The method as claimed in claim 1 wherein the primary aromatic amines, secondary aromatic amines, and polycyclic tertiary aromatic amines are separated from said alkylene carbonate-aromatic amines solution by vaporization of said amines.

5. The method as claimed in claim 1 wherein the primary aromatic amines, secondary aromatic amines, and polycyclic tertiary aromatic amines are separated from said alkylene carbonate-aromatic amines solution by water washing to remove said carbonate.

6. The method as claimed in claim 1 wherein the primary aromatic amines, secondary aromatic amines, and polycyclic tertiary aromatic amines are separated from said alkylene carbonate-aromatic amines solution by extraction of said aromatic amines with a lower aliphatic ether containing from 4 to 12 carbon atoms and vaporizing said ether therefrom.

7. The method as claimed in claim 1 wherein the monocyclic tertiary amines are recovered by vaporization of said paraffin hydrocarbon from said paraffin hydrocarbon-monocyclic tertiary amines solution.

8. The method as claimed in claim 1 wherein the monocyclic tertiary amine is pyridine.

References Cited in the file of this patent

UNITED STATES PATENTS 2,695,267    Challis _____ Nov. 23, 1954